Patented July 6, 1943

2,323,445

UNITED STATES PATENT OFFICE 2,323,445

AROMATIC COPPER - MERCAPTO COMPOUND AND A PROCESS OF PREPARING IT

Max Bockmühl and Walter Persch, Frankfort-on-the-Main-Hochst, Germany, assignors to Winthrop Chemical Company, Inc., New York, N. Y., a corporation of New York No Drawing. Application December 6, 1940, Serial No. 368,888. In Germany December 27, 1938

9 Claims. (Cl. 260—438)

The present invention relates to new aromatic copper-mercapto compounds and to a process of preparing them.

In German Patent No. 565,064 there are described, inter alia, copper compounds which are obtained by causing copper salts to react with mercapto compounds containing basic side chains with aliphatically bound tertiary nitrogen.

Now we have found that copper-mercapto compounds which are valuable as remedies may be obtained by causing copper salts to react with aromatic compounds free from aliphatic basic side chains, which contain a tautomerizable S-atom, and if desired introducing radicals rendering the products soluble in water.

As parent materials may be used, for instance, compounds containing a thiourea radical bound to an aromatic nucleus, such as thiourea benzoic acid, phenylthiohydantoincarboxylic acid, pyridinethiourea and similar compounds.

The thiourea radical may also be linked to the aromatic nucleus in the form of a ring as it is the case with the thiobenzimidazole-sulfonic acid and similar compounds. Furthermore, there may be used aromatic mercaptooxazoles and aromatic mercaptothiazoles.

The parent materials used in accordance with the present invention may be characterized by the presence of one of the groupings:

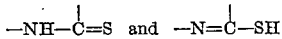

The process is carried out, for instance, by causing a copper salt to react with one of the beforementioned compounds containing a salt-forming group or another group imparting solubility, such as thiourea benzoic acid and converting the complex copper compound obtained into one of its salts. It is also possible to use as parent materials aromatic mercapto compounds which do not contain a salt-forming group, or aromatic mercapto compounds the salts of which give in water a strongly acid or alkaline reaction, such as aminophenylthiourea, hydroxyphenylthiobenzimidazole and others.

The reaction may be conducted in the presence of water or in the presence of an hydrophilic solvent or diluent.

When the reaction with the copper salts is complete, there may be introduced by this invention solubilizing groups into the copper mercapto compounds obtained. Thus, for instance, the hydroxy compounds obtained may be caused to react with chloroacetic acid, aceto-bromo-glucose (in this latter case the acetyl groups being subsequently split off), and the amino-compounds may be caused to react with sodium acetaldehyde-disulfonate and similar compounds.

For the formation of the copper compounds there may be used copper salts of any kind, for instance, copper acetate, copper chloride, copper sulfate, copper nitrate and others.

The products obtained by the invention are intended to be used in the case of infectious diseases, especially of tuberculosis.

The following examples serve to illustrate the invention, but they are not intended to limit it thereto:

(1) 5 grams of 3-phenyl-2-thiohydantoin acetic acid-(5) of the formula

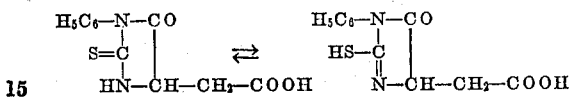

obtainable by causing phenyl mustard oil to react with aspartic acid (cf. Beilstein, Handbuch der organischen Chemie, 4th edition, vol. 25, page 248: reaction of phenylisocyanate with aspartic acid with formation of 3-phenylhydantoin acetic acid-(5)), are dissolved in 20.5 cc. of N-caustic soda solution and 100 cc. of water. When a solution of 1.7 grams of crystallized copper chloride in 50 cc. of water is added to the solution thus obtained, a brownish-green precipitate is formed which is filtered with suction and washed with water. By dissolving the product in methanol and adding a sodium methylate solution until the reaction is feebly alkaline to turmeric paper, the sodium salt of copper-mercapto-phenylhydantoin acetic acid is formed which is precipitated by means of ether in the form of a grey-green product.

(2) 6.3 grams of symmetrical diphenylthio-urea-meta-benzoic acid of the formula

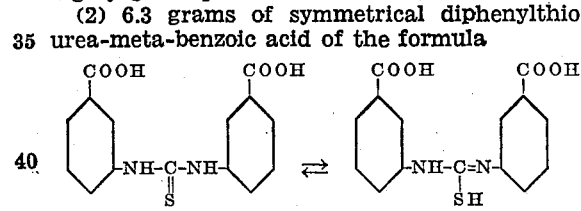

are dissolved with water in the calculated quantity of N-caustic soda solution and an aqueous copper chloride solution is added thereto until the precipitation is complete. The precipitate of the copper-mercaptophenylurea benzoic acid thus formed is suspended in methanol and dissolved by means of a sodium methylate solution. The sodium salt is precipitated by means of ether.

(3) 70.8 grams of meta-allylthiourea benzoic acid of the formula

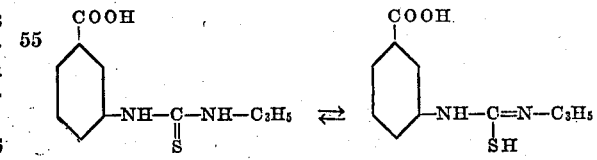

(obtainable by causing meta-amino benzoic acid to react with allyl mustard oil), are dissolved in 700 cc. of water and 40.5 grams of a caustic soda solution of 29.7 per cent strength. The solution thus obtained is heated to 75° C. and an equally warm solution of 39 grams of crystallized copper sulfate in 400 cc. of water is caused to run in within 10 minutes, while stirring. Immediately, a grey-green precipitate separates which is filtered with suction after a quarter of an hour without being cooled and washed with cold water. The product dried by filtering with suction is then dissolved, while stirring, with such a quantity of caustic soda solution as is necessary for rendering the solution just a trace alkaline to phenolphtalein. After a 3 hours' standing at room temperature the solution is freed from some undissolved matter by filtering with suction and the absolutely clear dark-red brown filtrate is introduced, drop by drop, while vigorously stirring, into 3 liters of denaturated alcohol. The copper compound immediately precipitates in the form of a light-brown powder which is filtered with suction, washed with alcohol and ether and dried under reduced pressure at moderate temperature.

(4) 47.2 grams of meta-allylthiourea benzoic acid are dissolved with 8 grams of caustic soda and 300 cc. of water; a solution of 24.97 grams of crystallized copper sulfate in 100 cc. of water is introduced, drop by drop, into the solution thus obtained. There is obtained an aqueous suspension of copper allylthiourea benzoic acid into which a solution of further 8 grams of caustic soda in 50 cc. of water is introduced, drop by drop. A brown solution of the sodium salt of copper-allylthiourea benzoic acid is formed which is carefully evaporated to dryness under reduced pressure. From the residue the sodium salt is extracted by means of methanol. On addition of ether to the methanol solution the sodium salt precipitates which is identical with the product obtained according to Example 3.

(5) 5 grams of meta-allylthiourea benzoic acid methyl ester of the formula

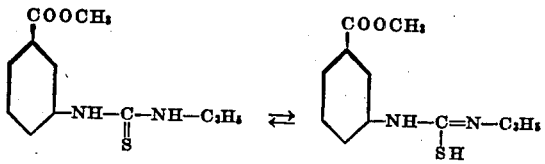

dissolved in 200 cc. of ethyl acetate are mixed with 1.7 grams of crystallized copper chloride, dissolved in 100 cc. of acetone, and shaken for 2 hours while adding 1.7 grams of sodium bicarbonate in 50 cc. of water. The aqueous layer is separated, the ethyl acetate is evaporated together with the acetone and the residue is triturated with ether. It dissolves in lipotrope solvents, such as cyclohexanone or acetic acid benzyl ester.

(6) 3.9 grams of para-hydroxyphenylmercapto-tetrazole of the formula

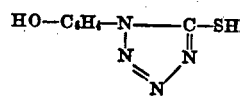

(obtainable from para-hydroxyphenyl mustard oil and sodium azide) are dissolved in 100 cc. of acetone and 300 cc. of water and mixed with a solution of 2.5 grams of crystallized copper sulfate in 200 cc. of water. The grey precipitate which has been formed is the copper-mercapto compound which is soluble in water in the form of its sodium salt.

(7) 8.06 grams of the hydrochloride of 6-amino-2-mercapto-benzimidazole of the formula

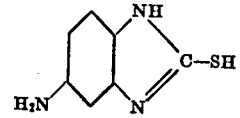

and 250 cc. of water are mixed, while stirring, with 3.4 grams of crystallized copper chloride, dissolved in 25 cc. of water. A gelatinous, transparent mass is formed which is stirred into 1.5 liters of acetone in order to obtain the solid copper-mercapto compound.

(8) 7.9 grams of the condensation product from sodium acetaldehyde-disulfonate and 6-amino-2-mercaptobenzimidazole of the formula

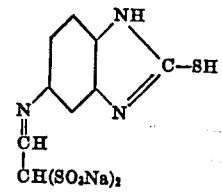

—obtainable by heating both substances in water until solution occurs—are dissolved in water and mixed with a solution of 1.7 grams of crystallized copper chloride in water. The copper compound which separates is filtered with suction and washed with water. It is soluble in water in the form of its sodium salt.

(9) To 9.8 grams of the hydrochloride of 6-amino-2-mercapto-3-methyl-benzimidazole of the formula

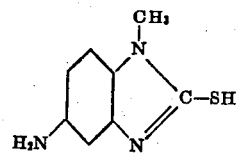

dissolved in 700 cc. of methanol, there is added, while stirring, a solution of 3.87 grams of crystallized copper chloride, dissolved in 200 cc. of acetone. The solution is filtered and evaporated under reduced pressure. The residue is washed with acetone and ether; it is the copper compound of the thio-compound used as parent material.

(10) 5.76 grams of sodium 2-mercaptobenzimidazole-5-sulfonate having the formula

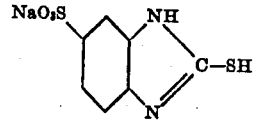

are dissolved in 160 cc. of alcohol and 45 cc. of water. By adding a solution of 1.7 grams of crystallized copper chloride in 75 cc. of acetone a yellowish precipitate is formed, the sodium salt of which is the sodium copper-mercaptobenzimidazole-sulfonate and dissolves easily in water.

(11) 5.5 grams of 2-mercaptobenzimidazole-5-arsonic acid of the formula

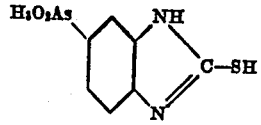

are dissolved in 40 cc. of N-caustic soda solution. 3.4 grams of crystallized copper chloride are added to this solution. The blue-green precipitate formed is filtered with suction and washed with water. By dissolving it in caustic soda solution and precipitating it with absolute alcohol the sodium salt of 2-copper-mercaptobenzimidazole-5-arsonic acid is obtained.

(12) 5.06 grams of sodium 2-mercaptobenzoxazole-5-sulfonate having the formula

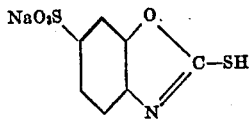

are mixed in 50 cc. of water with 1.7 grams of crystallized copper chloride, the reaction of the solution being kept neutral by addition of N-caustic soda solution. When this solution is caused to run into absolute alcohol, the proportion of the solution to the alcohol being 1:2, the sodium salt of 2-copper-mercaptobenzoxazole-5-sulfonic acid separates.

(13) 4.22 grams of 2-mercaptobenzothiazole-5-carboxylic acid of the formula

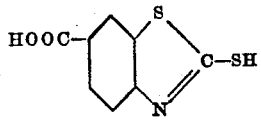

are dissolved in 50 cc. of water and 20 cc. of N-caustic soda solution. On addition of 3.4 grams of crystallized copper chloride a green precipitate is formed which is filtered with suction and washed with water. The dried product is the copper-mercaptobenzothiazole-5-carboxylic acid. It may be dissolved like the above mentioned copper compounds in alkalies or nitrogen containing bases, such as ethylenediamine.

(14) 3.04 grams of phenylthiourea of the formula

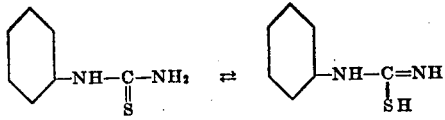

dissolved in 150 cc. of acetone are mixed with a solution of 2.0 grams of copper acetate $$[(CH_3COO)_2Cu.1H_2O]$$

in 30 cc. of water. The precipitate which has been formed after standing for some time is filtered with suction, washed with acetone and water and dried. It is the copper compound of phenylthiourea.

(15) 3.4 grams of 2-mercaptobenzothiazole of the formula

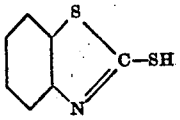

dissolved in 50 cc. of acetone, are mixed with a solution of 2.0 grams of crystallized copper acetate in 30 cc. of water. A light-brown precipitate is formed which is filtered with suction and washed with acetone and water. As analysis shows (found: 15.96 per cent. of Cu; calculated: 16.10 per cent. of Cu), it is the copper compound of 2-mercaptobenzothiazole.

We claim:

1. The process which comprises adding an aqueous solution of copper sulfate to an aqueous solution of the sodium salt of meta-allylthioureabenzoic acid and isolating the copper compound thus formed.

2. The sodium salt of the copper derivative of N-allyl-N'(meta-carboxy-phenyl) thiourea, said sodium salt having the formula

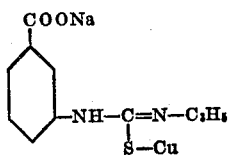

and being a light brown powder, readily soluble in water.

3. A water-soluble salt of an acid having the following formula

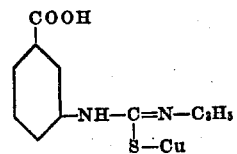

4. A water soluble salt of the copper derivative, in which copper is in combination with sulfur, of a thiourea N-substituted by at least one phenyl group.

5. A water soluble salt of the copper derivative, in which copper is in combination with sulfur, of a thiourea N-substituted by at least one carboxyphenyl group.

6. The copper derivative of a N-meta-carboxyphenyl-N'-allyl thiourea in which copper is in combination with sulfur.

7. The process which comprises reacting a copper salt with a solution of a N-meta-carboxyphenyl-N'-allyl thiourea, and isolating the copper derivative thus formed.

8. A process which comprises adding a solution of a copper salt to a solution of a water soluble salt of a N-meta-carboxyphenyl-N-allyl thiourea, and isolating the copper derivative thus formed.

9. A process which comprises reacting a copper salt with a solution of a thiourea N-substituted by at least one carboxyphenyl group, and isolating the copper derivative thus formed.

MAX BOCKMÜHL.
WALTER PERSCH.